July 14, 1942.    R. C. MARCEAU    2,289,510
SOLDERING APPARATUS
Filed July 15, 1940    3 Sheets-Sheet 1
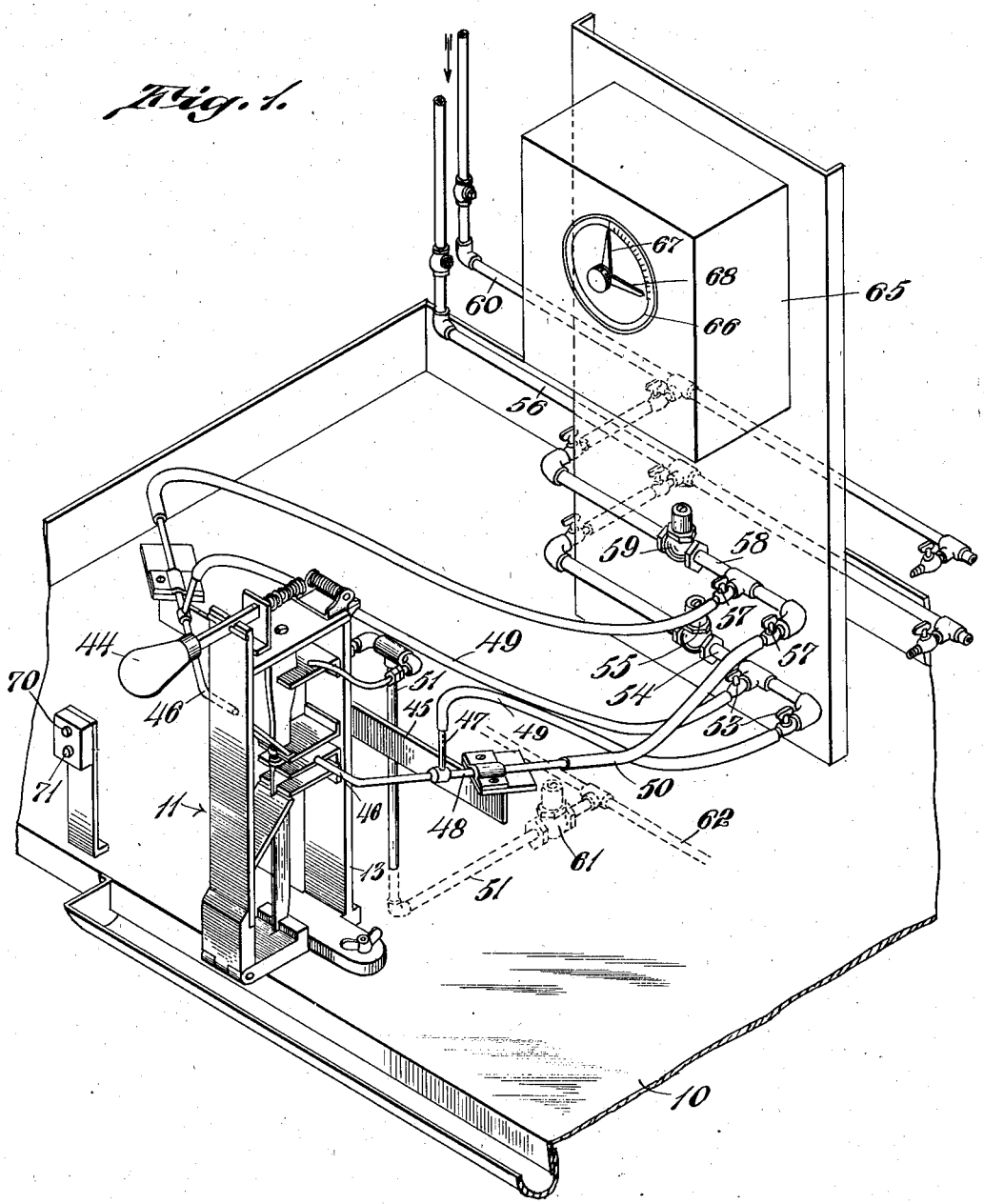
INVENTOR.
Robert C. Marceau
BY Barlow & Barlow
ATTORNEYS.

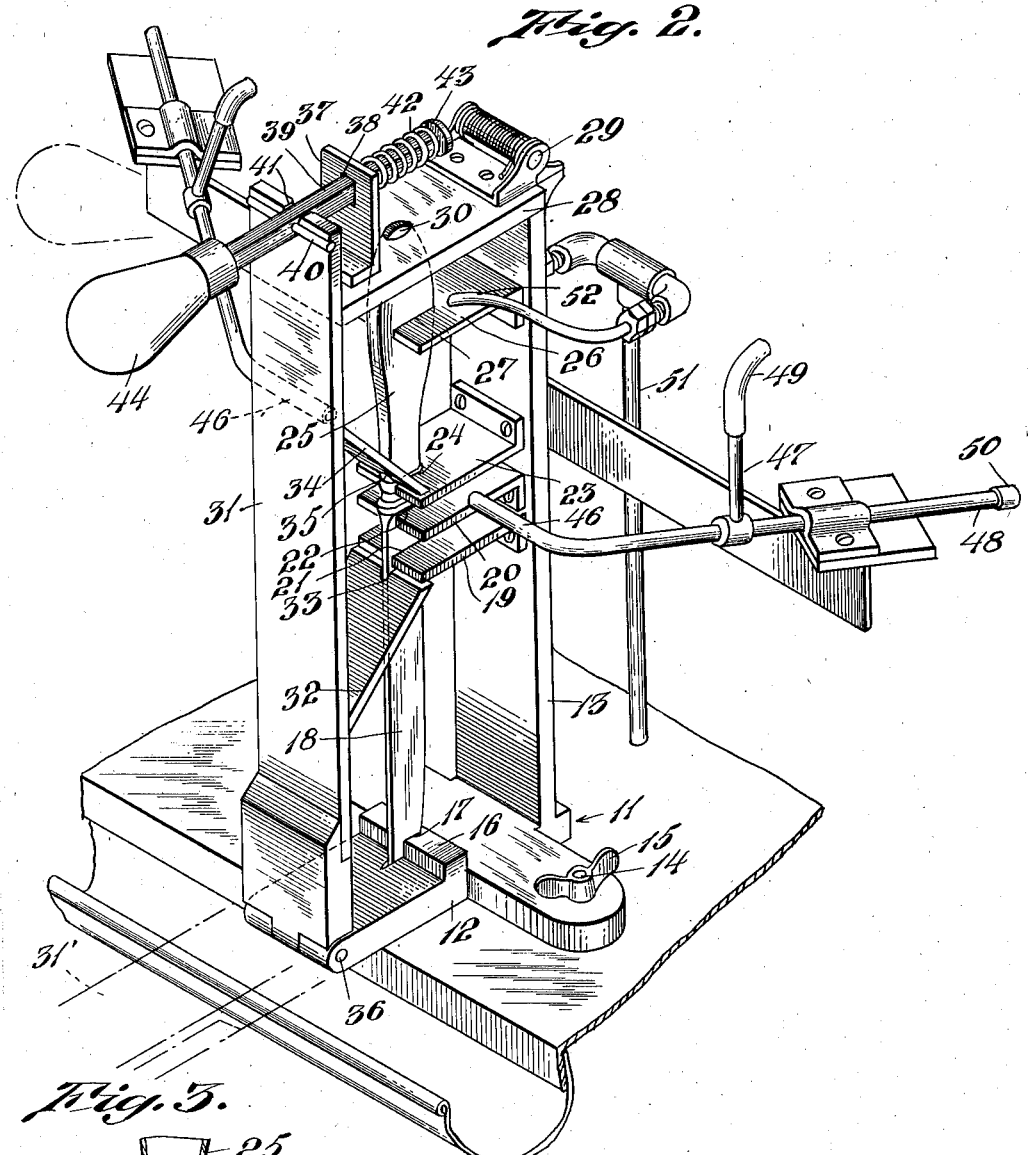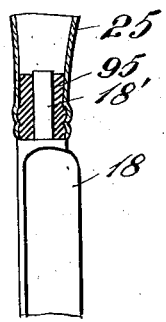

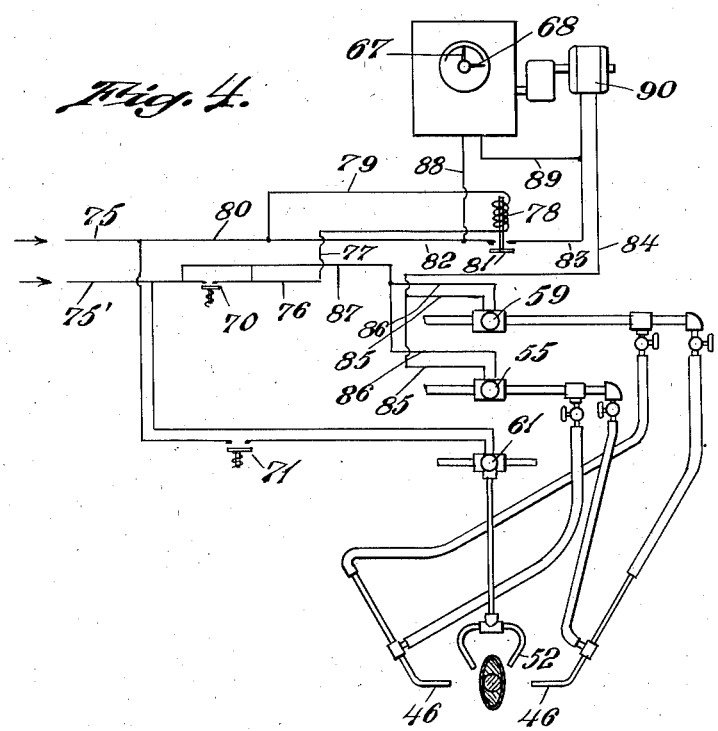

Patented July 14, 1942

2,289,510

UNITED STATES PATENT OFFICE 2,289,510

SOLDERING APPARATUS

Robert Charles Marceau, Riverside, R. I.

Application July 15, 1940, Serial No. 345,525

1 Claim. (Cl. 113—59)

This invention relates to a soldering apparatus, more particularly for the soldering of flat tableware such, for instance, as soldering of the silver handle to the steel blade of a knife; and the invention has for one of its objects to provide a simple, accurate and convenient mechanism requiring less skilled labor for the performing of a soldering operation of this character.

Another object of the invention is to provide an apparatus which may be simply and quickly loaded and controlled by one or more push buttons through automatic mechanism.

Another object of the invention is to provide an apparatus which may be quickly operated.

Another object of the invention is to provide an apparatus in which the heat will be applied for a predetermined length of time dependent upon the work which is being done.

Another object of the invention is to make automatic and free of manual errors many of the operations in connection with the soldering of two pieces of work together.

With these and other objects in view, the invention consists of certain novel features of construction, as will be more fully described, and particularly pointed out in the appended claim.

In the accompanying drawings:

Fig. 1 is a perspective view of a fragmental portion of the table illustrating the unit of the apparatus in the relative positions which they will assume in operation;

Fig. 2 is a perspective view showing on a larger scale the jig for holding the table knife in position for soldering;

Fig. 3 is a sectional view of a fragmental portion of the work; and

Fig. 4 is a diagrammatic view showing the work in section and the relative arrangement of certain operating parts of the apparatus and wiring diagram illustrating the manner in which it operates.

In high grade flat ware it is desirable that the handles be soldered onto the blades of the knives; and to perform this accurately requires skilled labor; or for quicker operation, a complicated machine, which has been found to be unsatisfactory. In order to simplify the soldering apparatus, I have arranged a jig to hold the handle and blade in desired position with blow torches for directing a gas flame to the desired location for the application of heat, and I have also provided water for cooling when the heat has performed its function. Further, I have arranged for automatic controls for controlling the valves by which the gas, air and water are supplied so that after the jig is loaded, a push button control only is necessary that the soldering operation and the cooling may be performed; and the following is a more detailed description of the present embodiment of this invention, illustrating the preferred means by which these advantageous results may be accomplished:

With reference to the drawings, 10 designates a table top or suitable support upon which the apparatus is mounted. At the forward edge of the table adjacent to a position where the operator would be located and convenient for the operator I have provided a jig designated generally 11 and consisting of a body portion having a base 12 and standard 13. The base is provided with a suitable opening through which bolts 14 extend to secure the jig to the table top as by means of wing nuts 15.

A boss 16 is slotted as at 17 for the reception of the end of the blade 18 of the table knife. Arms 19 and 20 notched as at 21 and 22 also receive the upper portion of the blade of the table knife and fix the alignment of the same in position. An arm 23 notched as at 24 receives the end portion of the handle 25 of the table knife, while an arm 26 notched as at 27 receives the larger intermediate portion of the table knife for properly aligning these parts and locating them in relation to the blade.

A top plate 28 is hinged as at 29 to the upright standard 13 and is provided with an opening 30 for the reception of the upper tip end of the handle 25 so as to assist in locating the handle in desired position, while a front plate 31 hinged as at 36 to the base portion 12 for swinging to and from open and closed position is provided with an upwardly inclined arm 32 notched as at 33 and a downwardly inclined arm 34 notched as at 35 for the reception of the handle. These arms afford some resiliency and are located on converging angles so as to well brace the knife blade and handle in position. The base standard 13, top plate and front plate form a frame-like jig as illustrated.

In order to lock these two hinged plates 31 and 28 in position, I have provided an upstanding guide 37 having an opening 38 to suitably guide a bar 39. This bar is provided with a cross pin 40 and may be received in a notch 41 in the upper end of the plate 31 while a spring 42 abutting the shoulder 43 and the guide tends to move the bar 39 through the opening 38 to pull the pin 40 against the plate 31. Release of this holding may be had by means of pulling on the handle 44 to slide the bar 39 against the tension of the spring 42 to permit the pin to be lifted over the edge of the plate 31.

It will be readily apparent that the plate 31 when released may be swung to the dotted line position indicated at 31', while the plate 28 may then be lifted to free the upper tip of the knife which is located in the opening 30.

Across the rear portion of the upright standard 13, the support bar 45 is secured, and upon this support bar there is suitably mounted the nozzles 46 having a T-shaped inlet 47 and an aligned inlet 48. Gas conduit 49 is connected to the inlet 47 and an air conduit 50 is connected to the inlet 48 so that a blow torch is arranged in conjunction with the nozzles 46 which directs a flame to the desired location on the work.

The support bar 45 also supports one or more conduits 51 for conveying water to nozzles 52, such nozzles being located on either side of the handle at an upper location thereof so that when water is caused to flow the nozzles may cause water to trickle down the knife and cool the same.

The gas conduits 49 are controlled by individual adjustment valves 53, (see Fig. 1), while both conduits lead from a common conduit 54 which is controlled by a solenoid valve 55 in an electric circuit for suitable operation, and this conduit 54 is connected to the main conduit 56. The air conduits are likewise controlled by manually adjusted valves 57 and extend from common conduit 58 controlled by solenoid valve 59 coming from a common supply 60. The water conduit 51 is controlled by a solenoid valve 61 coming from some common source of supply 62.

A timing unit designated generally 65 is provided with a dial 66 and arms 67 and 68 to be set for determining the time of closure of a circuit which will control the solenoid valves. The operation of the timing unit is by means of a push button control 69 having buttons 70, 71. In Fig. 3 I have illustrated schematically a wiring diagram for the accomplishment of the results desired. The main circuit is designated 75, 75' and the push buttons are designated 70, 71. The solenoid valves 55, 59, 61 correspond to their previous designation and are shown as wired in a conventional manner as hereinafter described.

In operation, when the push button 70 is pressed, the circuit is closed along the lines 76, 77 to the coil 78 back through line 79, 80 to the other side of the line. This coil 78 draws up the armature 81 to close the circuit through line 80, 82, 83 to the motor 90, thence returning through line 84 through the solenoid valves 55, 59, in parallel by means of lines 85, 86, 87 to 75'. This causes the motor to be put in operation which immediately completes a circuit through lines 88 and 89 from 75 so that upon release of the buttons 70 and dropping of the armature 81, the motor will still be in an operating circuit until the contact is broken mechanically by reaching a certain insulating point which may be varied at will by reason of the adjustment of the arms 67 and 68 through some known arrangement which is not a part of this invention. Upon the motor's arriving at this circuit-breaking point, the settings return to normal so that when the button 70 is pressed again, the operation will be repeated, and the flame will be directed to its desired location for a certain predetermined length of time which will vary according to different work which is being done.

After the soldering operation is completed, the flame is reduced to a mere pilot light which will be arranged for by reason of the setting of the valves. The operator will push the button 71, and the water will be applied to the work to cool the same. Thereafter, the operator will open the jig by means of the handle 44, remove the soldered blade and handle and place in the jig another handle and blade for repeating the operation. The blade 18 has a pin 18' to be received in the hollow handle 25 together with a piece of solder 95 which is placed in the jig for the soldering operation. A series of units may be arranged along the table to be successively operated by an attendant.

In some instances, the timing device will be so arranged that upon completion of the flame-applying time, when this shuts off, water will be caused to be applied to the work for cooling the same, all automatically and without the need of pressing a second button 71. This is a mere mechanical operation which may be readily arranged in the timing device which is heretofore described.

The foregoing description is directed solely towards the construction illustrated, but I desire it to be understood that I reserve the privilege of resorting to all the mechanical changes to which the device is susceptible.

I claim:

An apparatus for soldering a handle onto a knife blade comprising a table, a jig for holding the handle and knife blade in assembled relation to be soldered together secured to the table top adjacent to the front edge thereof and provided with a support thereon, nozzles on opposite sides of said jig secured to said support in a manner to direct a flame in proximity to the juncture of said blade and handle, air and gas conduits connected to said nozzles and each provided with a solenoid controlled valve and a manually controlled valve therein, water nozzles arranged on opposite sides of said jig for directing water against the knife assembly to cool the same after soldering, a water conduit extending upwardly through the table top and connected to said water nozzles and having a solenoid controlled valve therein, a support extending upwardly from said table top, a timing device secured to said support and operably connected to said solenoids for actuating the same for opening and closing said solenoid controlled valves, a graduated dial on said timing device positioned therein at a location to be visible from the front of said table, a pointer operatively connected to the mechanism of said timing device and manually movable over the face of said dial to indicate the time setting of the mechanism of said timing device, and a trough extending from said table top for carrying away the flow of water from said water nozzles.

ROBERT C. MARCEAU.